US012451206B2

(12) United States Patent
Sutera et al.

(10) Patent No.: US 12,451,206 B2
(45) Date of Patent: Oct. 21, 2025

(54) EXTENDING FUNCTIONALITY OF MEMORY CONTROLLERS USING A LOOPBACK MODE FOR TESTING IN A PROCESSOR-BASED DEVICE

(71) Applicant: Ampere Computing LLC, Santa Clara, CA (US)

(72) Inventors: Massimo Sutera, Sunnyvale, CA (US); Rakesh Kumar, Cupertino, CA (US); Kha Minh Huynh, Ho Chi Minh (VN); Sandeep Brahmadathan, Dublin, CA (US); Anil Kumar Handenahalli Rajanna, San Jose, CA (US); Nagi Aboulenein, King City, OR (US)

(73) Assignee: Ampere Computing LLC, Santa Clara, CA (US)

( * ) Notice: Subject to any disclaimer, the term of this patent is extended or adjusted under 35 U.S.C. 154(b) by 189 days.

(21) Appl. No.: 18/381,568

(22) Filed: Oct. 18, 2023

(65) Prior Publication Data

US 2025/0131970 A1    Apr. 24, 2025

(51) Int. Cl.
*G11C 7/00* (2006.01)
*G11C 29/12* (2006.01)
(Continued)

(52) U.S. Cl.
CPC .......... *G11C 29/1201* (2013.01); *G11C 29/42* (2013.01); *G11C 29/44* (2013.01)

(58) Field of Classification Search
CPC ...... G11C 29/1201; G11C 29/42; G11C 29/44
(Continued)

(56) References Cited

U.S. PATENT DOCUMENTS 6,928,593 B1 * 8/2005 Halbert .................. G11C 29/14
365/201
8,332,464 B2 * 12/2012 Dispensa ............ H04L 63/0272
709/229

(Continued)

OTHER PUBLICATIONS

Notice of Allowance for U.S. Appl. No. 17/856,299, mailed Aug. 5, 2024, 9 pages.

(Continued)

*Primary Examiner* — Viet Q Nguyen
(74) *Attorney, Agent, or Firm* — Withrow & Terranova, PLLC

(57) ABSTRACT

Apparatus and methods for extending functionality of memory controllers using a loopback mode for testing are disclosed herein. In one aspect, a processor-based device provides a memory access intercept circuit configured to receive a memory write request that is directed to and received by a memory controller. The memory access intercept circuit transmits proxy write data to the memory controller, and intercepts write data directed to the memory controller for the memory write request. The memory access intercept circuit stores the write data in a write data buffer, and, upon intercepting the proxy write data from the memory controller directed to a physical (PHY) interface circuit, retrieves the write data from the write data buffer and transmits the write data to the PHY interface circuit. The memory access intercept circuit subsequently receives, from the PHY interface circuit, loopback data, and stores the loopback data in a read data buffer.

20 Claims, 10 Drawing Sheets

(51) Int. Cl.
*G11C 29/42* (2006.01)
*G11C 29/44* (2006.01)

(58) Field of Classification Search
USPC .......................................................... 365/201
See application file for complete search history.

(56) References Cited

U.S. PATENT DOCUMENTS

| | | | |
|---|---|---|---|
| 9,432,298 B1* | 8/2016 | Smith | H04L 49/9057 |
| 9,525,665 B1* | 12/2016 | Evans | H04L 63/0281 |
| 9,842,045 B2* | 12/2017 | Heorhiadi | G06F 11/3692 |
| 10,978,170 B2* | 4/2021 | Lee | G11C 29/00 |
| 11,531,584 B2* | 12/2022 | Lee | G06F 11/1048 |
| 11,997,008 B1* | 5/2024 | Gnanasekaran | H04L 45/566 |
| 12,058,055 B2* | 8/2024 | Jung | H04L 47/6255 |
| 2011/0035560 A1* | 2/2011 | Bodrozic | G01R 31/31716 |
| | | | 711/155 |
| 2012/0096257 A1 | 4/2012 | Li et al. | |
| 2019/0332469 A1 | 10/2019 | Radjai et al. | |
| 2023/0096468 A1* | 3/2023 | Ong | H04L 47/2441 |
| | | | 370/235 |
| 2024/0004577 A1 | 1/2024 | Sutera et al. | |

OTHER PUBLICATIONS

Non-Final Office Action for U.S. Appl. No. 17/856,299, mailed Mar. 6, 2024, 10 pages.

* cited by examiner

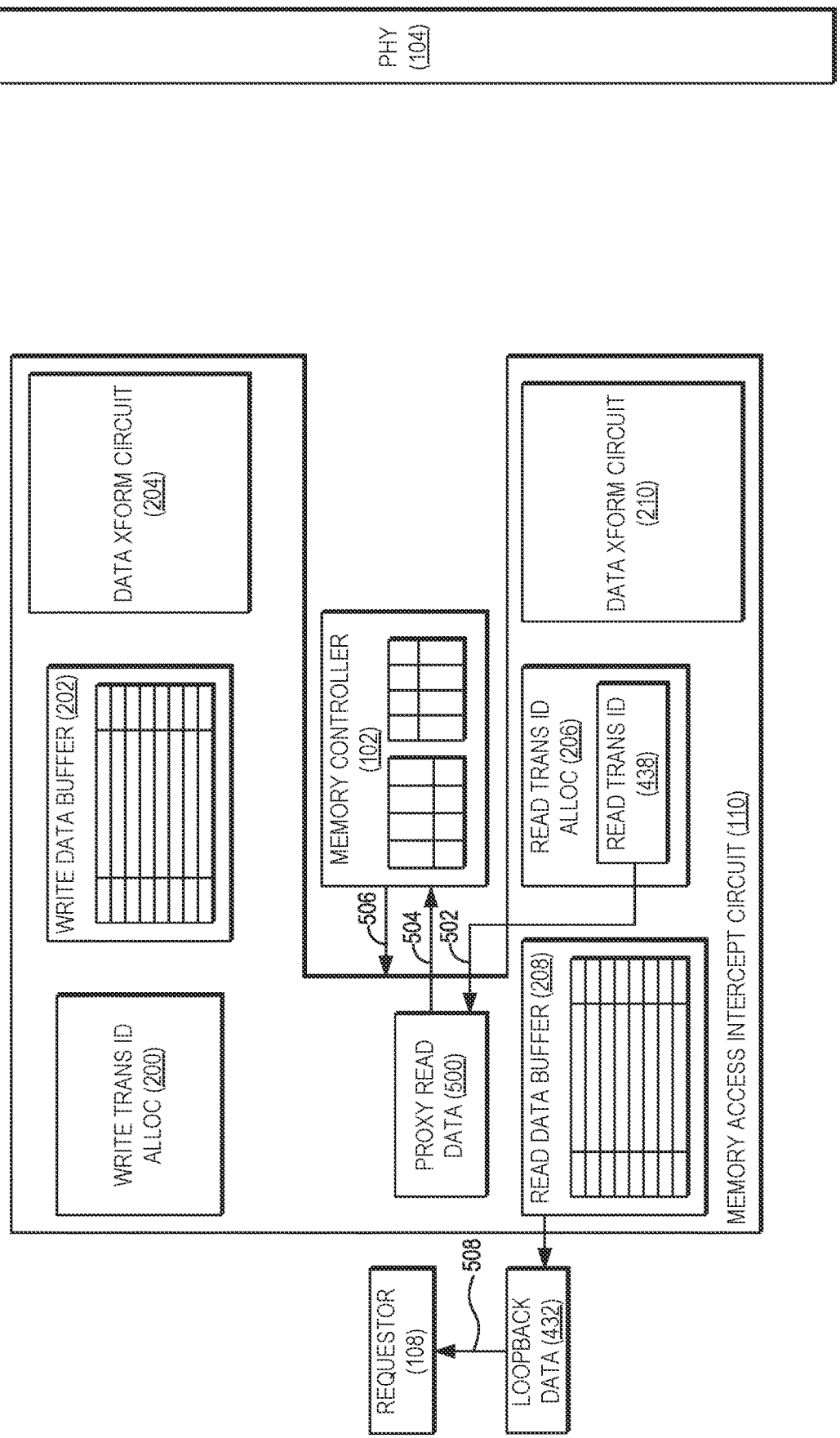

EXTENDING FUNCTIONALITY OF MEMORY CONTROLLERS USING A LOOPBACK MODE FOR TESTING IN A PROCESSOR-BASED DEVICE

BACKGROUND

I. Field of the Disclosure

The technology of the disclosure relates generally to memory controllers in a processor-based device, and specifically to extending or augmenting the functionality of a memory controller without directly modifying the memory controller.

II. Background

Modern processor-based devices provide a specialized digital circuit known as a memory controller for managing memory access operations (e.g., memory write operations and memory read operations) to a memory device such as system memory. Because the logic for managing the flow of data to and from the memory device is embodied by the memory controller, conventional approaches for extending or augmenting the functionality of the memory controller necessarily involve directly modifying the circuitry of the memory controller itself. However, such direct modifications may be rendered impossible or infeasible due to technical limitations or, in the case of third-party manufacturers, restrictions on access to the underlying intellectual property. Accordingly, a mechanism for extending the functionality of the memory controller without the need to alter the memory controller itself is desirable. It is further desirable for such a mechanism to provide additional functionality to enable functional validation and screening of integral elements of the mechanism before incurring the cost of integrating the mechanism into a processor-based device.

SUMMARY OF THE DISCLOSURE

Aspects disclosed in the detailed description include apparatus and methods for extending functionality of memory controllers using a loopback mode for testing in a processor-based device. In one aspect, a processor-based device provides a memory access intercept circuit that is communicatively coupled to a memory controller and a physical (PHY) interface circuit, where the memory access intercept circuit and the PHY interface circuit are configured to operate in a loopback mode. In the loopback mode, the memory access intercept circuit receives, from a requestor, a memory write request that is directed to and received by the memory controller. In some aspects, the memory access intercept circuit generates a write transaction identifier (ID) for the memory write request. The memory access intercept circuit then transmits proxy write data (e.g., comprising the write transaction ID) to the memory controller. The memory access intercept circuit intercepts write data from the requestor directed to the memory controller for the memory write request, and stores the write data in a write data buffer (e.g., in association with the write transaction ID). The memory access intercept circuit intercepts the proxy write data from the memory controller directed to the PHY interface circuit, and retrieves the write data from the write data buffer (e.g., based on the write transaction ID of the proxy write data). The memory access intercept circuit in some aspects may perform a first data transformation on the write data to generate first transformed data by, e.g., encrypting the write data and/or encoding a custom error correction code (ECC) based on the write data.

The memory access intercept circuit then transmits the write data to the PHY interface circuit (e.g., by transmitting the first transformed data as the write data). The memory access intercept circuit subsequently receives, from the PHY interface circuit, loopback data directed to the memory controller in response to a read signal from the memory access intercept circuit. Some aspects may provide that the memory access intercept circuit receives the loopback data by receiving second transformed data, and performing a second data transformation on the second transformed data (e.g., by decrypting the second transformed data or decoding the custom ECC) to obtain the loopback data. The memory access intercept circuit according to some aspects generates a read transaction ID for the read signal. The memory access intercept circuit then stores the loopback data in a read data buffer (e.g., in association with the read transaction ID).

The memory access intercept circuit in some aspects performs a read phase of the loopback mode by transmitting the read transaction ID to the memory controller as proxy read data. The memory access intercept circuit intercepts the proxy read data from the memory controller directed to the requestor. The memory access intercept circuit next retrieves the loopback data from the read data buffer based on the read transaction ID of the proxy read data. The memory access intercept circuit then transmits the loopback data to the requestor. In aspects in which the requestor comprises a testing circuit, the testing circuit may perform a comparison of the write data and the loopback data. The testing circuit in such aspects may then generate a test result indication based on the comparison.

In another exemplary aspect, a processor-based device is provided. The processor-based device comprises a memory controller, a PHY interface circuit that is communicatively coupled to the memory controller and that is configured to operate in a loopback mode, and a memory access intercept circuit. The memory access intercept circuit is configured to operate in the loopback mode by being configured to receive, from a requestor, a memory write request that is directed to and received by the memory controller. The memory access intercept circuit is further configured to transmit proxy write data to the memory controller. The memory access intercept circuit is also configured to intercept write data from the requestor directed to the memory controller for the memory write request. The memory access intercept circuit is additionally configured to store the write data in a write data buffer. The memory access intercept circuit is further configured to intercept the proxy write data from the memory controller directed to the PHY interface circuit. The memory access intercept circuit is also configured to retrieve the write data from the write data buffer. The memory access intercept circuit is additionally configured to transmit the write data to the PHY interface circuit. The memory access intercept circuit is further configured to receive, from the PHY interface circuit, loopback data directed to the memory controller in response to a read signal from the memory access intercept circuit. The memory access intercept circuit is also configured to store the loopback data in a read data buffer.

In another exemplary aspect, a method for extending functionality of memory controllers using a loopback mode for testing in a processor-based device is provided. The method comprises receiving, by a memory access intercept circuit of the processor-based device from a requestor, a memory write request that is directed to and received by a memory controller of the processor-based device. The method further comprises transmitting, by the memory access intercept circuit, proxy write data to the memory controller. The method also comprises intercepting, by the memory access intercept circuit, write data from the requestor directed to the memory controller for the memory write request. The method additionally comprises storing, by the memory access intercept circuit, the write data in a write data buffer. The method further comprises intercepting, by the memory access intercept circuit, the proxy write data from the memory controller directed to a PHY interface circuit of the processor-based device. The method also comprises retrieving, by the memory access intercept circuit, the write data from the write data buffer. The method additionally comprises transmitting, by the memory access intercept circuit, the write data to the PHY interface circuit. The method further comprises receiving, by the memory access intercept circuit from the PHY interface circuit, loopback data directed to the memory controller in response to a read signal from the memory access intercept circuit. The method also comprises storing, by the memory access intercept circuit, the loopback data in a read data buffer.

BRIEF DESCRIPTION OF THE FIGURES

FIG. 5 is a block diagram illustrating exemplary functionality of the memory access intercept circuit of FIG. 1 for intercepting and processing memory read requests during a read phase of a loopback mode, according to some aspects;

DETAILED DESCRIPTION

Figure 1:
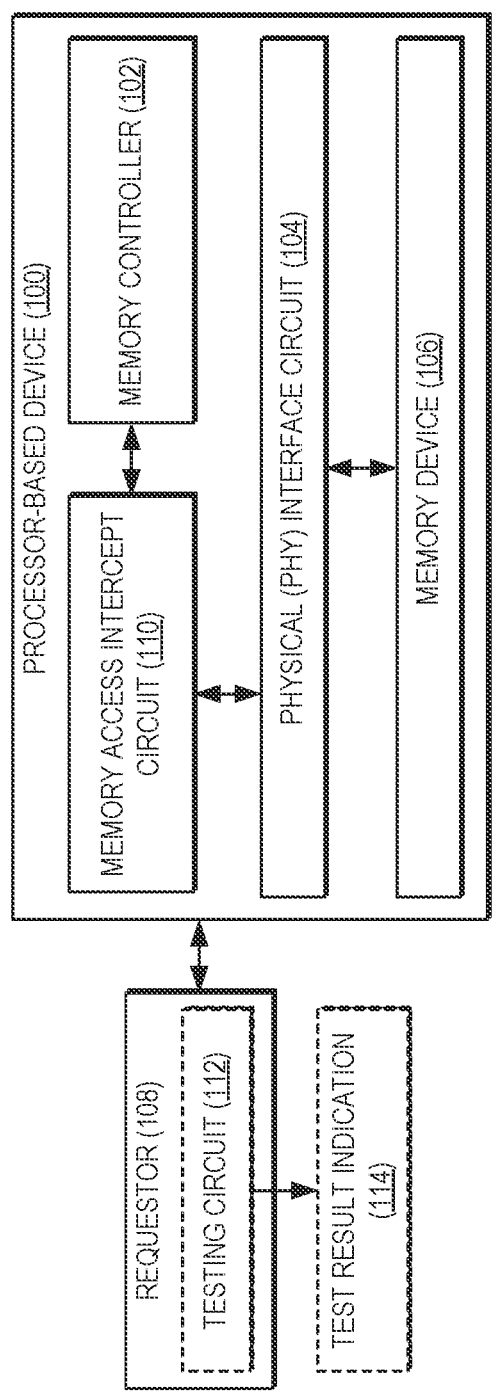
FIG. 1 is a block diagram of an exemplary processor-based device configured to extend functionality of memory controllers using a loopback mode, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like (e.g., "first transformed data," "second transformed data") are used herein to distinguish between similarly named elements, and is not intended to indicate an ordinal relationship between such elements unless expressly indicated.

Aspects disclosed in the detailed description include apparatus and methods for extending functionality of memory controllers using a loopback mode for testing in a processor-based device. In one aspect, a processor-based device provides a memory access intercept circuit that is communicatively coupled to a memory controller and a physical (PHY) interface circuit, where the memory access intercept circuit and the PHY interface circuit are configured to operate in a loopback mode. In the loopback mode, the memory access intercept circuit receives, from a requestor, a memory write request that is directed to and received by the memory controller. In some aspects, the memory access intercept circuit generates a write transaction identifier (ID) for the memory write request. The memory access intercept circuit then transmits proxy write data (e.g., comprising the write transaction ID) to the memory controller. The memory access intercept circuit intercepts write data from the requestor directed to the memory controller for the memory write request, and stores the write data in a write data buffer (e.g., in association with the write transaction ID). The memory access intercept circuit intercepts the proxy write data from the memory controller directed to the PHY interface circuit, and retrieves the write data from the write data buffer (e.g., based on the write transaction ID of the proxy write data). The memory access intercept circuit in some aspects may perform a first data transformation on the write data to generate first transformed data by, e.g., encrypting the write data and/or encoding a custom error correction code (ECC) based on the write data.

The memory access intercept circuit then transmits the write data to the PHY interface circuit (e.g., by transmitting the first transformed data as the write data). The memory access intercept circuit subsequently receives, from the PHY interface circuit, loopback data directed to the memory controller in response to a read signal from the memory access intercept circuit. Some aspects may provide that the memory access intercept circuit receives the loopback data by receiving second transformed data, and performing a second data transformation on the second transformed data (e.g., by decrypting the second transformed data or decoding the custom ECC) to obtain the loopback data. The memory access intercept circuit according to some aspects generates a read transaction ID for the read signal. The memory access intercept circuit then stores the loopback data in a read data buffer (e.g., in association with the read transaction ID).

The memory access intercept circuit in some aspects performs a read phase of the loopback mode by transmitting the read transaction ID to the memory controller as proxy read data. The memory access intercept circuit intercepts the proxy read data from the memory controller directed to the requestor. The memory access intercept circuit next retrieves the loopback data from the read data buffer based on the read transaction ID of the proxy read data. The memory access intercept circuit then transmits the loopback data to the requestor. In aspects in which the requestor comprises a testing circuit, the testing circuit may perform a comparison of the write data and the loopback data. The testing circuit in such aspects may then generate a test result indication based on the comparison.

In this regard, FIG. 1 illustrates an exemplary processor-based device 100 that includes a memory controller 102 and a PHY interface circuit 104 that provides read and write access to a memory device 106. The memory controller 102 of FIG. 1 is configured to receive memory access requests (e.g., memory write requests and memory read requests) directed to the memory device 106 from a requestor 108 (e.g., a software process or application, or a hardware device external to the processor-based device 100). The memory device 106 may comprise, as a non-limiting example, a system memory comprising dynamic random access memory (DRAM). The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the processor-based device 100 may include elements in addition to those illustrated in FIG. 1. For example, the processor-based device 100 may further include one or more central processing units (CPUs), processor cores, caches, controllers, communications buses, and/or persistent storage devices, which are omitted from FIG. 1 for the sake of clarity.

As noted above, it may be desirable to extend or augment the functionality of the memory controller 102 by performing data transformation operations, such as encryption and decryption and custom ECC generation, on data to be written to the memory device 106 and/or read from the memory device 106 using the memory controller 102. However, implementing such data transformations by direct modification of the memory controller 102 may be impossible or impractical due to technical limitations and/or by restrictions on access to the underlying intellectual property. In addition, it may be desirable to provide functionality to enable functional validation and screening of elements of the processor-based device 100 prior to integration of the processor-based device 100 into another device as a constituent element.

Accordingly, the processor-based device 100 of FIG. 1 provides a memory access intercept circuit 110 that is configured to extend the functionality of the memory controller 102 without physically modifying the memory controller 102 itself, and in a manner transparent to the memory controller 102 and the memory device 106. This functionality when operating in a non-loopback mode is discussed in greater detail below with respect to FIGS. 2 and 3. Additionally, the memory access intercept circuit 110 is configured to operate in a loopback mode to facilitate testing of the integral elements of the processor-based device 100, as discussed in greater detail below with respect to FIGS. 4 and 5.

When the memory access intercept circuit 110 is operating in the loopback mode, the requestor 108 can test the processor-based device 100 to detect faults, e.g., before the processor-based device 100 is integrated into another device. For instance, in some aspects, the requestor 108 may comprise a testing circuit 112. The testing circuit 112 may transmit write data (not shown) to the memory access intercept circuit 110, and may receive loopback data (not shown) in response. The testing circuit 112 may then compare the write data and the loopback data, and may generate a test result indication 114 based on the comparison. If the write data and the loopback data are the same, the test result indication 114 indicates that the memory access intercept circuit 110 passes the functional testing. However, if the testing circuit 112 determines that the write data and the loopback data do not match, the test result indication 114 will indicates that the memory access intercept circuit 110 fails the functional testing.

Figure 2:
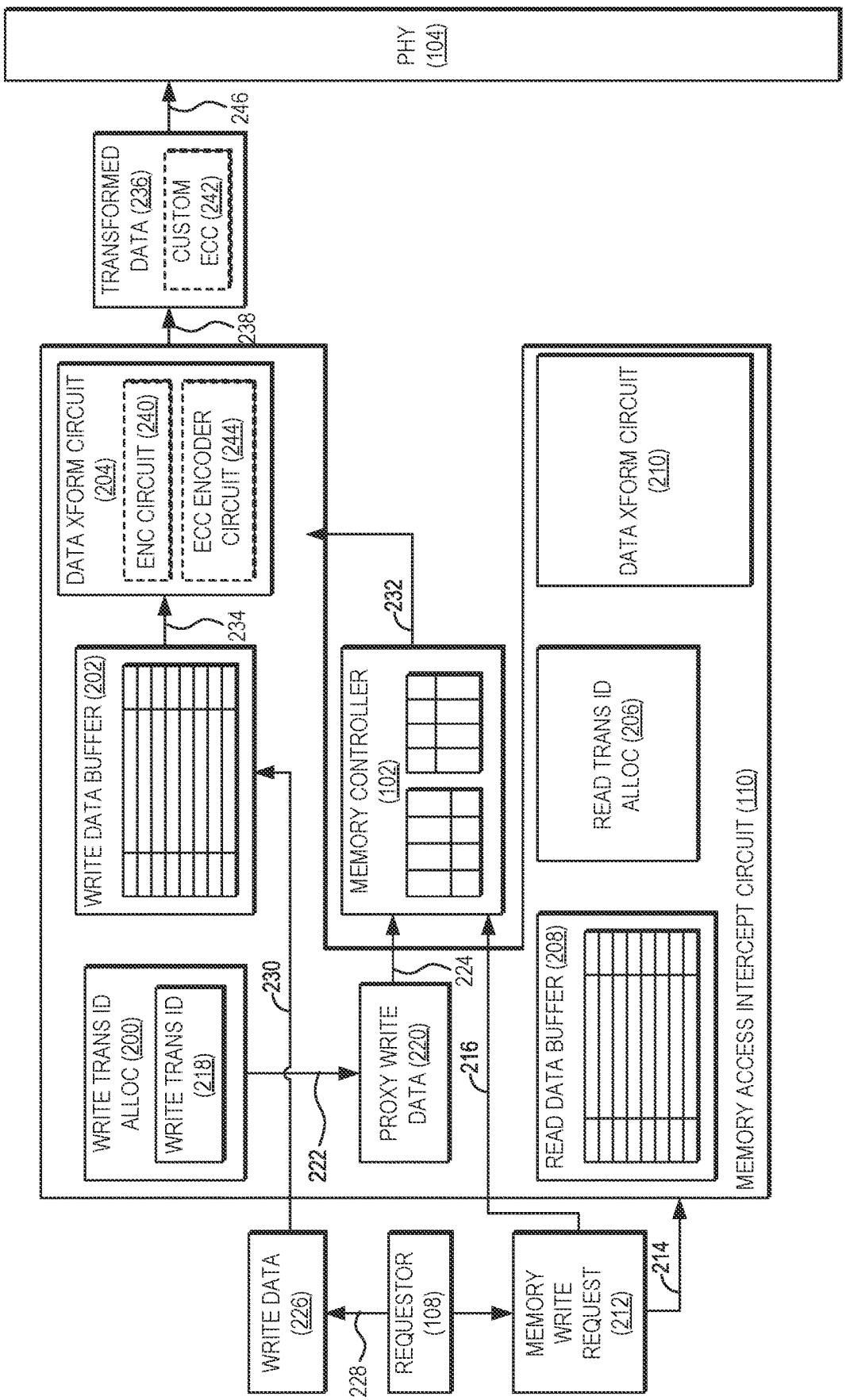
FIG. 2 is a block diagram illustrating exemplary functionality of the memory access intercept circuit of FIG. 1 for intercepting and processing memory write requests when operating in a non-loopback mode, according to some aspects.

FIG. 2 illustrates exemplary functionality of the memory access intercept circuit 110 of FIG. 1 for intercepting and processing memory write requests when operating in a non-loopback mode. As seen in FIG. 2, the memory access intercept circuit 110 comprises a write transaction ID allocation circuit (captioned as "WRITE TRANS ID ALLOC" in FIG. 2) 200 for generating write transaction IDs for memory write requests, a write data buffer 202 for temporary storage of information relating to memory write requests, and a data transformation circuit (captioned as "DATA XFORM CIRCUIT" in FIG. 2) 204 for performing a desired data transformation before write data is stored in the memory device 106 of FIG. 1. The memory access intercept circuit 110 further comprises a read transaction ID allocation circuit (captioned as "READ TRANS ID ALLOC" in FIG. 2) 206 for generating read transaction IDs for memory read requests, a read data buffer 208 for temporary storage of information relating to memory read requests, and a data transformation circuit (captioned as "DATA XFORM CIRCUIT" in FIG. 2) 210 for performing a desired data transformation before read data is stored in the memory device 106 (e.g., to reverse a previous data transformation performed by the data transformation circuit 204). Functionality of the write transaction ID allocation circuit 200, the write data buffer 202, and the data transformation circuit 204 is discussed in greater detail below with respect to FIG. 2, while functionality of the read transaction ID allocation circuit 206, the read data buffer 208, and the data transformation circuit 210 is discussed in greater detail below with respect to FIG. 3. It is to be understood that some aspects of the memory access intercept circuit 110 may include more or fewer elements than those illustrated in FIG. 2.

In exemplary operation, the memory access intercept circuit 110 is configured to receive, from the requestor 108, a memory write request 212 (as indicated by arrow 214) that is directed to the memory controller 102, and that is also received by the memory controller 102 (as indicated by arrow 216). This may be accomplished in some aspects by coupling the memory access intercept circuit 110 to a splitter (not shown) in a memory bus or other communications line (not shown) via which the memory controller 102 receives the memory write request 212. The memory write request 212 may comprise, as a non-limiting example, a memory address to which data will be written by the memory device 106 via the PHY interface circuit (captioned as "PHY" in FIG. 2) 104.

Using the write transaction ID allocation circuit 200, the memory access intercept circuit 110 generates a write transaction ID (captioned as "WRITE TRANS ID" in FIG. 2) 218 for the memory write request 212. The write transaction ID 218, which may be created using conventional techniques for generating unique identifiers, is used internally by the memory access intercept circuit 110 for tracking and processing the memory write request 212. In some aspects, the write transaction ID 218 may comprise an indicator (e.g., a highest bit of the write transaction ID, as a non-limiting example) that may be used to indicate that the write transaction ID 218 is associated with a memory write operation. The memory access intercept circuit 110 is configured to then use the write transaction ID 218 to generate proxy write data 220 to be sent to the memory controller 102 in place of actual write data for the memory write request 212, as indicated by arrow 222. The memory access intercept circuit 110 then transmits the write transaction ID 218 to the memory controller 102 as the proxy write data 220, as indicated by arrow 224.

The memory access intercept circuit 110 is configured to subsequently intercept write data 226 that is directed to the memory controller 102 by the requestor 108 for the memory write request 212, as indicated by arrow 228. As used herein, the term "intercept" and derivatives thereof refer to functionality of the memory access intercept circuit 110 for receiving a data transmission of data, such as the write data 226, directed to the memory controller 102, and preventing the data transmissions from reaching the memory controller 102 as intended by the sender (in this case, the requestor 108). Instead, the write data 226 is stored by the memory access intercept circuit 110 in the write data buffer 202 in association with the write transaction ID 218, as indicated by arrow 230.

The memory access intercept circuit 110 in some aspects is configured to then manipulate the write data 226 by performing a data transformation operation on the write data 226 before the memory access intercept circuit 110 sends the write data 226 to the memory device 106. Thus, in such aspects, the memory access intercept circuit 110 is configured to intercept a transmission of the proxy write data 220 from the memory controller 102 directed to the memory device 106 (i.e., as part of the conventional operation of the memory controller 102), as indicated by arrow 232. In response to intercepting the transmission of the proxy write data 220, the memory access intercept circuit 110 retrieves the write data 226 from the write data buffer 202 based on the write transaction ID 218 of the intercepted proxy write data 220, as indicated by arrow 234.

The memory access intercept circuit 110 next employs the data transformation circuit 204 to perform a data transformation on the write data 226 to generate transformed data 236, as indicated by arrow 238. The data transformation according to some aspects may comprise encryption of the write data 226 using an encryption circuit (captioned as "ENC CIRCUIT" in FIG. 2) 240, and/or encoding of a custom ECC 242 based on the write data 226 using an ECC encoder circuit 244, as non-limiting examples. As indicated by arrow 246, the memory access intercept circuit 110 then transmits the transformed data 236 to the PHY interface circuit 104.

In this manner, the memory access intercept circuit 110 can modify the write data 226 that is sent by the requestor 108 before the write data 226 is written to the memory device 106, in a way that is transparent to the requestor 108, the memory controller 102, and the memory device 106. Further, in contrast to conventional designs in which encryption or decryption may take place in a serial fashion before an associated memory controller can issue commands, performing encryption and decryption as described with respect to aspects of the present disclosure may permit the encryption and decryption to be performed at least in part in parallel with the associated memory controller issuing commands, which may improve latency.

Figure 3:
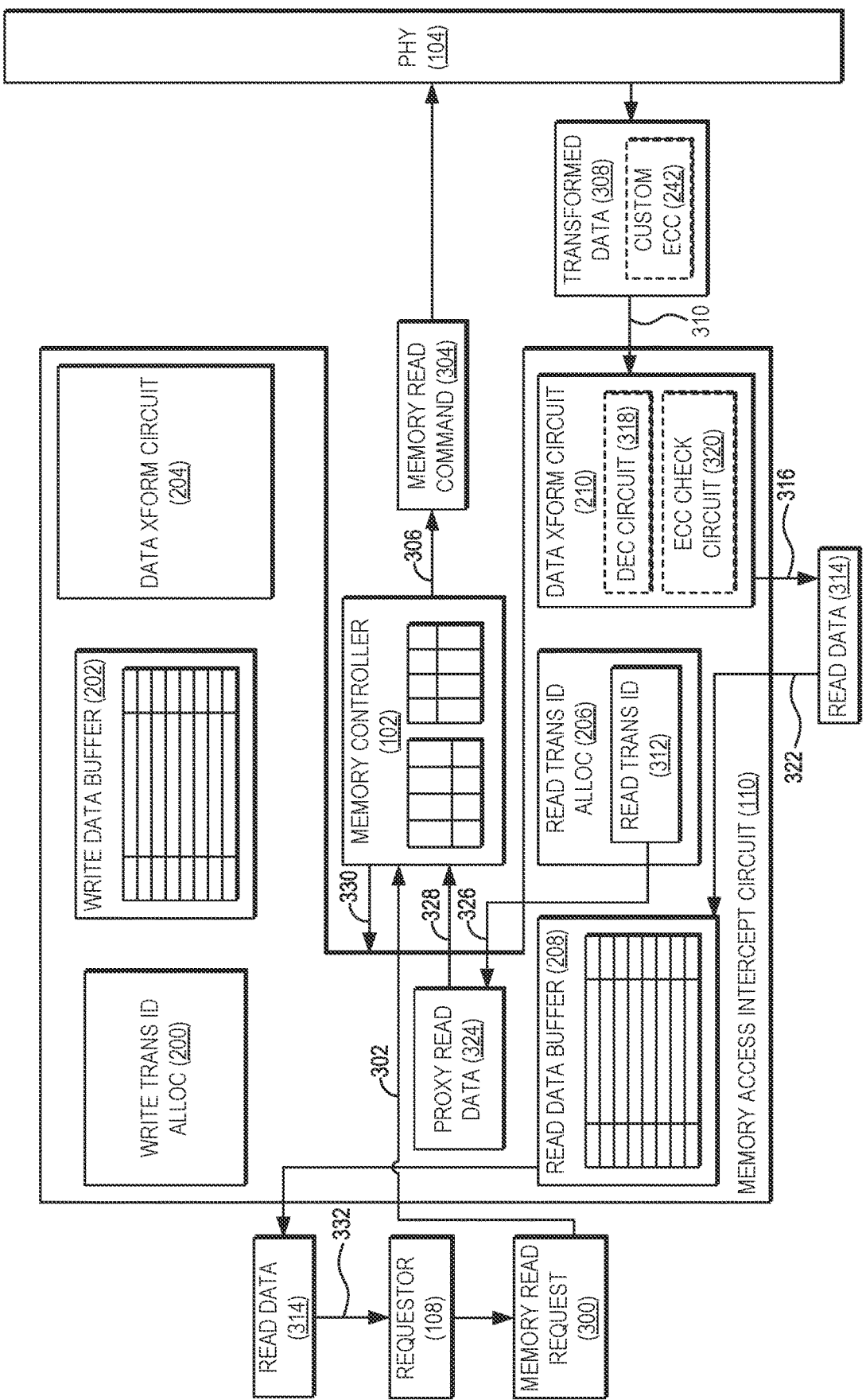
FIG. 3 is a block diagram illustrating exemplary functionality of the memory access intercept circuit of FIG. 1 for intercepting and processing memory read requests when operating in the non-loopback mode, according to some aspects.

FIG. 3 illustrates another aspect of the processor-based device 100 of FIG. 1, in which the memory access intercept circuit 110 provides further functionality for intercepting and processing memory read requests. In exemplary operation, the memory controller 102 receives a memory read request 300 from the requestor 108, as indicated by arrow 302. The memory controller 102, per conventional operation, transmits a memory read command 304 to the PHY interface circuit 104 to retrieve the requested data, as indicated by arrow 306. The memory access intercept circuit 110 subsequently intercepts a transmission of transformed data 308 (i.e., data that was previously modified by the data transformation circuit 204 of the memory access intercept circuit 110 prior to being stored in the memory device 106 during a write as described with respect to FIG. 1) from the PHY interface circuit (captioned as "PHY" in FIG. 3) 104 directed to the memory controller 102 responsive to the memory read command 304, as indicated by arrow 310.

Upon intercepting the transformed data 308, the memory access intercept circuit 110 generates a read transaction ID (captioned as "READ TRANS ID" in FIG. 3) 312 for the memory read command 304. As with the write transaction ID 218 discussed above, the read transaction ID 312 may be created using conventional techniques for generating unique identifiers, and is used internally by the memory access intercept circuit 110 for tracking and processing the memory read request 300. In some aspects, the read transaction ID 312 may comprise an indicator (e.g., a highest bit of the read transaction ID, as a non-limiting example) that may be used to indicate that the read transaction ID 312 is associated with a memory read operation.

The memory access intercept circuit 110 uses the data transformation circuit 210 to perform a data transformation on the transformed data 308 to obtain read data 314, as indicated by arrow 316. The data transformation performed by the data transformation circuit 210 may comprise, e.g., performing decryption of the transformed data 308 using a decryption circuit (captioned as "DEC CIRCUIT" in FIG. 3) 318, and/or performing decoding of the custom ECC 242 of the transformed data 308 using an ECC check circuit 320, as non-limiting examples. The memory access intercept circuit 110 next stores the read data 314 in the read data buffer 208 as indicated by arrow 322, and generates proxy read data 324 comprising the read transaction ID 312, as indicated by arrow 326. The memory access intercept circuit 110 then transmits the read transaction ID 312 to the memory controller 102 as the proxy read data 324, as indicated by arrow 328. Note that, in aspects in which the memory controller 102 expects data having a same size as a memory access size of the memory controller 102 but the read transaction ID 312 is smaller than the expected data size, the proxy read data 324 may comprise a plurality of copies of the read transaction ID 312.

The memory access intercept circuit 110 subsequently intercepts a transmission of the proxy read data 324 from the memory controller 102 directed to the requestor 108, as indicated by arrow 330. The memory access intercept circuit 110 retrieves the read data 314 from the read data buffer 208 based on the read transaction ID 312 of the proxy read data 324, and transmits the read data 314 to the requestor 108 as indicated by arrow 332. In this manner, the memory access intercept circuit 110 can manipulate data read from the memory device 106 in a manner that is transparent to the requestor 108, the memory controller 102, and the memory device 106.

Figure 4:
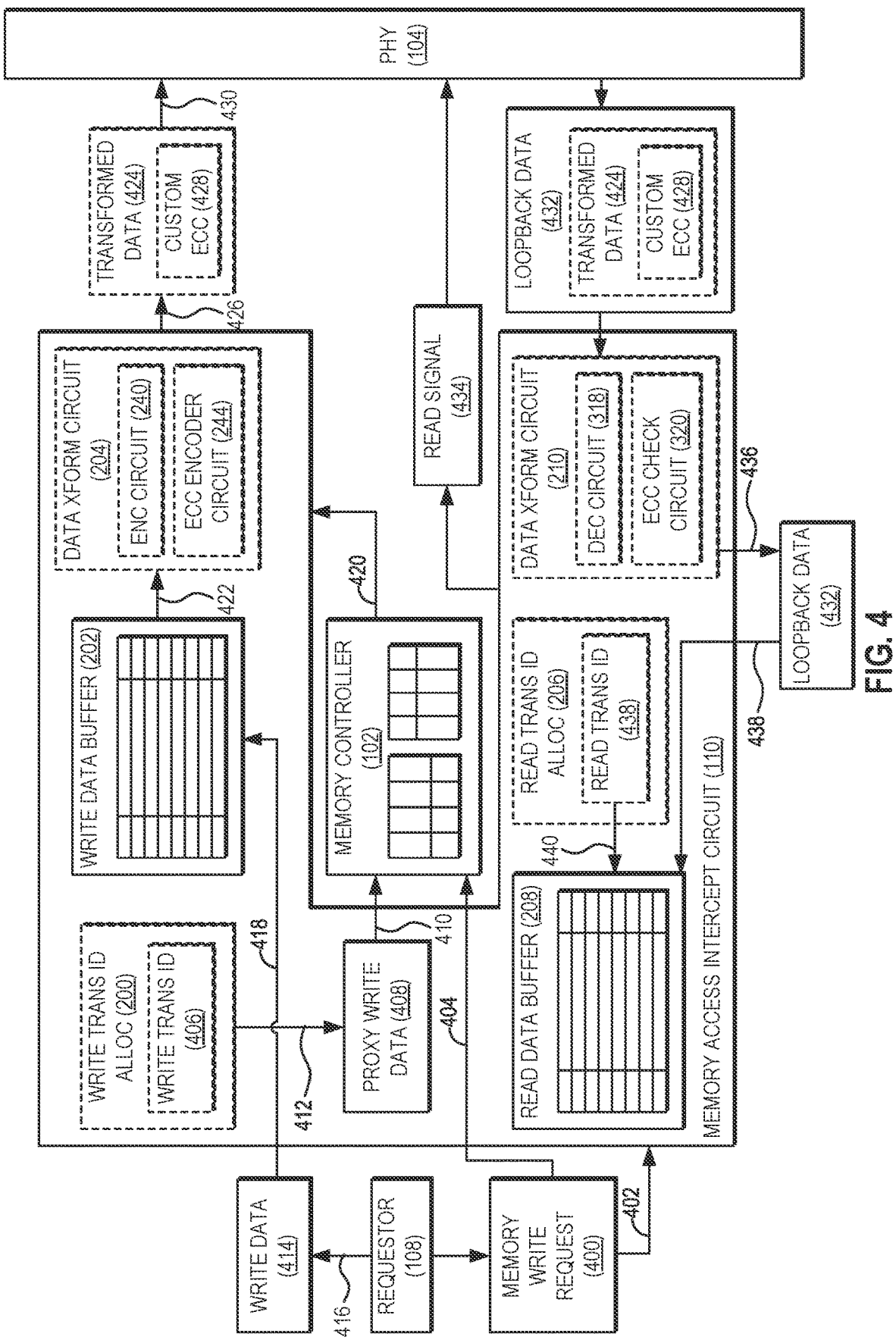
FIG. 4 is a block diagram illustrating exemplary functionality of the memory access intercept circuit of FIG. 1 for intercepting and processing memory write requests during a write phase of a loopback mode, according to some aspects.

FIGS. 4 and 5 illustrate exemplary functionality of the memory access intercept circuit 110 of FIG. 1 during a write phase and a read phase, respectively of a loopback mode, according to some aspects. In the examples of FIGS. 4 and 5, the memory access intercept circuit 110 and the PHY interface circuit (captioned as "PHY") 104 are configured to operate in the loopback mode by, e.g., setting an appropriate configuration register (not shown) of the processor-based device 100 of FIG. 1. It is to be understood that while the write phase and the read phase of operation in loopback mode are illustrated separately in FIGS. 4 and 5, respectively, the memory access intercept circuit 110 in exemplary operation performs both the write phase and the read phase as a single operation in the loopback mode.

Referring first to FIG. 4, the memory access intercept circuit 110 receives, from the requestor 108, a memory write request 400 (as indicated by arrow 402) that is directed to and received by the memory controller 102 (as indicated by arrow 404). Using the write transaction ID allocation circuit 200, the memory access intercept circuit 110 in the example of FIG. 4 generates a write transaction ID 406 for the memory write request 400, e.g., using conventional techniques for generating unique identifiers. The memory access intercept circuit 110 then transmits proxy write data 408 to the memory controller 102, as indicated by arrow 410. In some aspects, the memory access intercept circuit 110 may transmit the proxy write data 408 by transmitting the write transaction ID 406 to the memory controller 102 as the proxy write data 408, as indicated by arrow 412.

The memory access intercept circuit 110 subsequently intercepts write data 414 from the requestor 108 directed to the memory controller 102 for the memory write request 400, as indicated by arrow 416. The memory access intercept circuit 110 then stores the write data 414 in the write data buffer 202, as indicated by arrow 418. Some aspects may provide that storing the write data 414 in the write data buffer 202 comprises storing the write data 414 in the write data buffer 202 in association with the write transaction ID 406. The memory access intercept circuit 110 also intercepts the proxy write data 408 from the memory controller 102 directed to the PHY interface circuit 104, as indicated by arrow 420.

In response to intercepting the transmission of the proxy write data 408, the memory access intercept circuit 110 retrieves the write data 414 from the write data buffer 202, as indicated by arrow 422. According to some aspects, retrieving the write data 414 from the write data buffer 202 may comprise retrieving the write data 414 from the write data buffer 202 based on the write transaction ID 406 of the proxy write data 408. The memory access intercept circuit 110 in some aspects may then perform a data transformation on the write data 414 to generate transformed data 424, as indicated by arrow 426. Some such aspects may provide that performing the data transformation on the write data 414 comprises encrypting the write data 414 using the encryption circuit (captioned as "ENC CIRCUIT" in FIG. 4) 244, and/or encoding a custom ECC 428 based on the write data 414 using the ECC encoder circuit 244. The memory access intercept circuit 110 then transmits the write data 414 to the PHY interface circuit 104, as indicated by arrow 430. In some aspects, transmitting the write data 414 to the PHY interface circuit 104 may comprise transmitting the transformed data 424 as the write data 414.

The memory access intercept circuit 110 subsequently receives, from the PHY interface circuit 104, loopback data 432 directed to the memory controller 102 in response to a read signal 434 from the memory access intercept circuit 110. In some aspects, the loopback data 432 comprises the transformed data 424, in which case the memory access intercept circuit 110 performs a data transformation on the transformed data 424 to obtain the loopback data 432, as indicated by arrow 436. In some such aspects, performing the data transformation may comprise decrypting the loopback data 432 using the decryption circuit 318, and/or decoding the custom ECC 428 using the ECC check circuit 320. The memory access intercept circuit 110 then stores the loopback data 432 in the read data buffer 208 as indicated by arrow 438. The memory access intercept circuit 110 according to some aspects generates a read transaction ID (captioned as "READ TRANS ID" in FIG. 4) 438 for the read signal 434 using the read transaction ID allocation circuit (captioned as "READ TRANS ID ALLOC" in FIG. 4) 206. In such aspects, storing the loopback data 432 in the read data buffer 208 may comprise storing the loopback data 432 in the read data buffer 208 in association with the read transaction ID 438, as indicated by arrow 440.

Turning now to FIG. 5, in the read phase of the loopback mode, the memory access intercept circuit 110 in some aspects transmits the read transaction ID 438 to the memory controller 102 as proxy read data 500, as indicated by arrows 502 and 504. The memory access intercept circuit 110 intercepts the proxy read data 500 from the memory controller 102 directed to the requestor 108, as indicated by arrow 506. The memory access intercept circuit 110 then retrieves the loopback data 432 from the read data buffer 208 based on the read transaction ID 438 of the proxy read data 500, and transmits the loopback data 432 to the requestor 108, as indicated by arrow 508. In aspects in which the requestor 108 comprises the testing circuit 112 of FIG. 1, the testing circuit 112 may perform a comparison of the write data 414 and the loopback data 432, and may then generate the test result indication 114 of FIG. 1 based on the comparison.

To illustrate exemplary operations of the memory access intercept circuit 110 for extending functionality of the memory controller 102 using a loopback mode for testing as discussed above with respect to FIGS. 4 and 5, FIGS. 6A-6D provide a flowchart illustrating exemplary operations 600. Elements of FIGS. 1-5 are referenced in describing FIGS. 6A-6D for the sake of clarity. It is to be understood that, according to some aspects, the operations in FIGS. 6A-6D may be performed in an order other than that shown herein, and/or may be omitted.

Figure 6A:
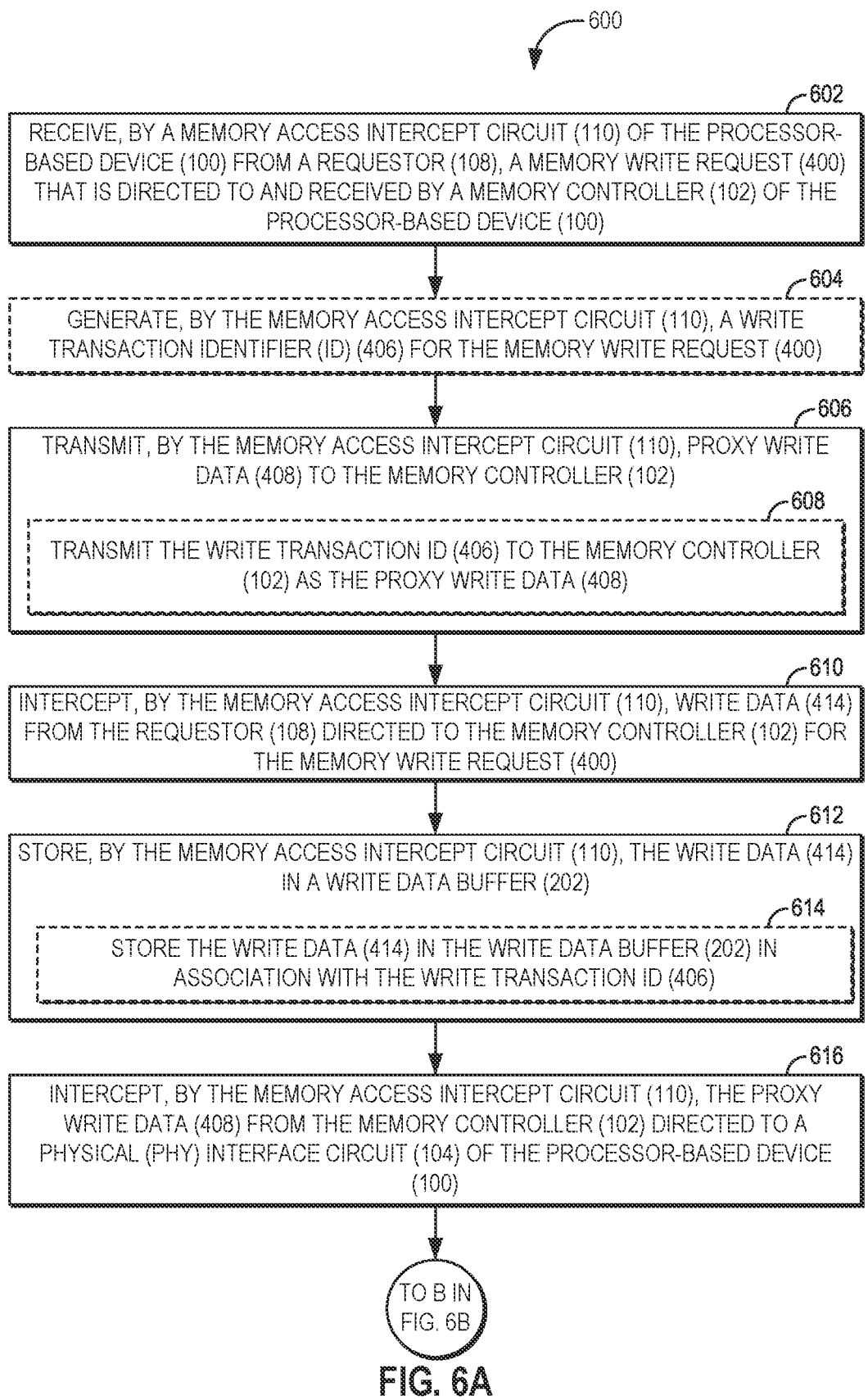
FIGS. 6A-6D provide a flowchart illustrating exemplary operations for extending functionality of memory controllers using a loopback mode for testing in the processor-based device of FIG. 1, according to some aspects.

The exemplary operations 600 begin in FIG. 6A begin with the memory access intercept circuit 110 of the processor-based device 100 receiving, from a requestor, such as the requestor 108 of FIGS. 1-5, a memory write request (e.g., the memory write request 400 of FIG. 4) that is directed to and received by a memory controller (such as the memory controller 102 of FIGS. 1-5) of the processor-based device 100 (block 602). In some aspects, the memory access intercept circuit 110 generates a write transaction ID (e.g., the write transaction ID 406 of FIG. 4) for the memory write request 400 (block 604). The memory access intercept circuit 110 then transmits proxy write data (such as the proxy write data 408 of FIG. 4) to the memory controller 102 (block 606). In aspects such as those referenced by block 604 above, the operations of block 606 for transmitting the proxy write data 408 may comprise the memory access intercept circuit 110 transmitting the write transaction ID 406 to the memory controller 102 as the proxy write data 408 (block 608).

The memory access intercept circuit 110 intercepts write data (e.g., the write data 414 of FIG. 4) from the requestor 108 directed to the memory controller 102 for the memory write request 400 (block 610). The memory access intercept circuit 110 then stores the write data 414 in a write data buffer (such as the write data buffer 202 of FIGS. 2-5) (block 612). Aspects such as those referenced by blocks 604 and 608 above may provide that the operations of block 612 for storing the write data 414 in the write data buffer 202 comprise storing the write data 414 in the write data buffer 202 in association with the write transaction ID 406 (block 614). The memory access intercept circuit 110 intercepts the proxy write data 408 from the memory controller 102 directed to a PHY interface circuit (e.g., the PHY interface circuit 104 of FIGS. 1-5) of the processor-based device 100 (block 616). The exemplary operations 600 continue at block 618 of FIG. 6B.

Figure 6B:
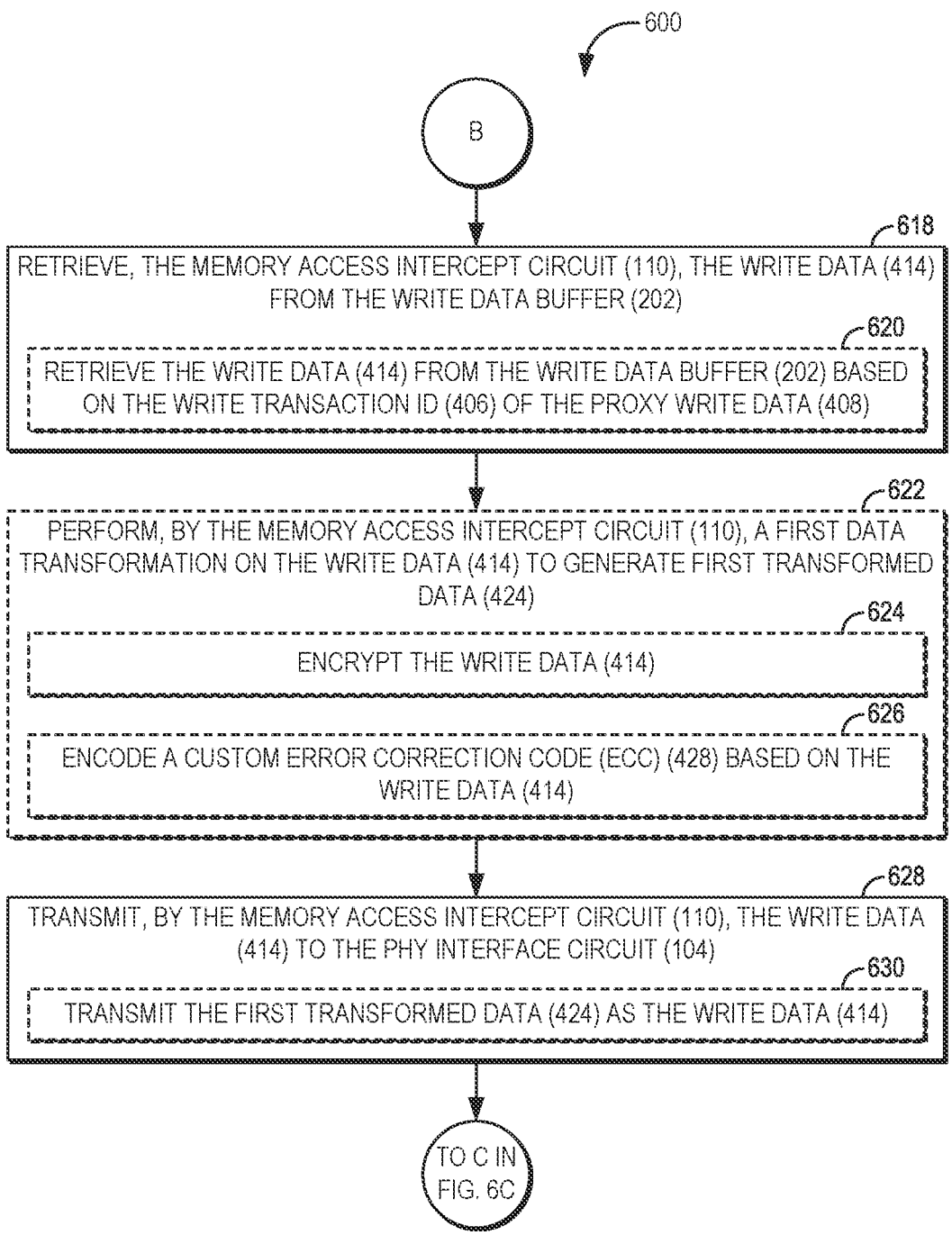

Turning now to FIG. 6B, the memory access intercept circuit 110 retrieves the write data 414 from the write data buffer 202 (block 618). According to aspects such as those referenced by blocks 604, 608, and 614 above, the operations of block 618 for retrieving the write data 414 from the write data buffer 202 may comprise retrieving the write data 414 from the write data buffer 202 based on the write transaction ID 406 of the proxy write data 408 (block 620). In some aspects, the memory access intercept circuit 110 may perform a first data transformation on the write data 414 to generate first transformed data (such as the transformed data 424 of FIG. 4) (block 622). Some such aspects may provide that the operations of block 622 for performing the first data transformation on the write data 414 comprise encrypting the write data 414 (block 624). According to some such aspects, the operations of block 622 for performing the first data transformation on the write data 414 may comprise encoding a custom ECC (e.g., the custom ECC 428 of FIGS. 4 and 5) based on the write data 414 (block 626).

The memory access intercept circuit 110 then transmits the write data 414 to the PHY interface circuit 104 (block 628). In aspects such as those referenced by block 622, the operations of block 628 for transmitting the write data 414 to the PHY interface circuit 104 may comprise transmitting the first transformed data 424 as the write data 414 (block 630). The exemplary operations 600 continue at block 632 of FIG. 6C.

Figure 6C:
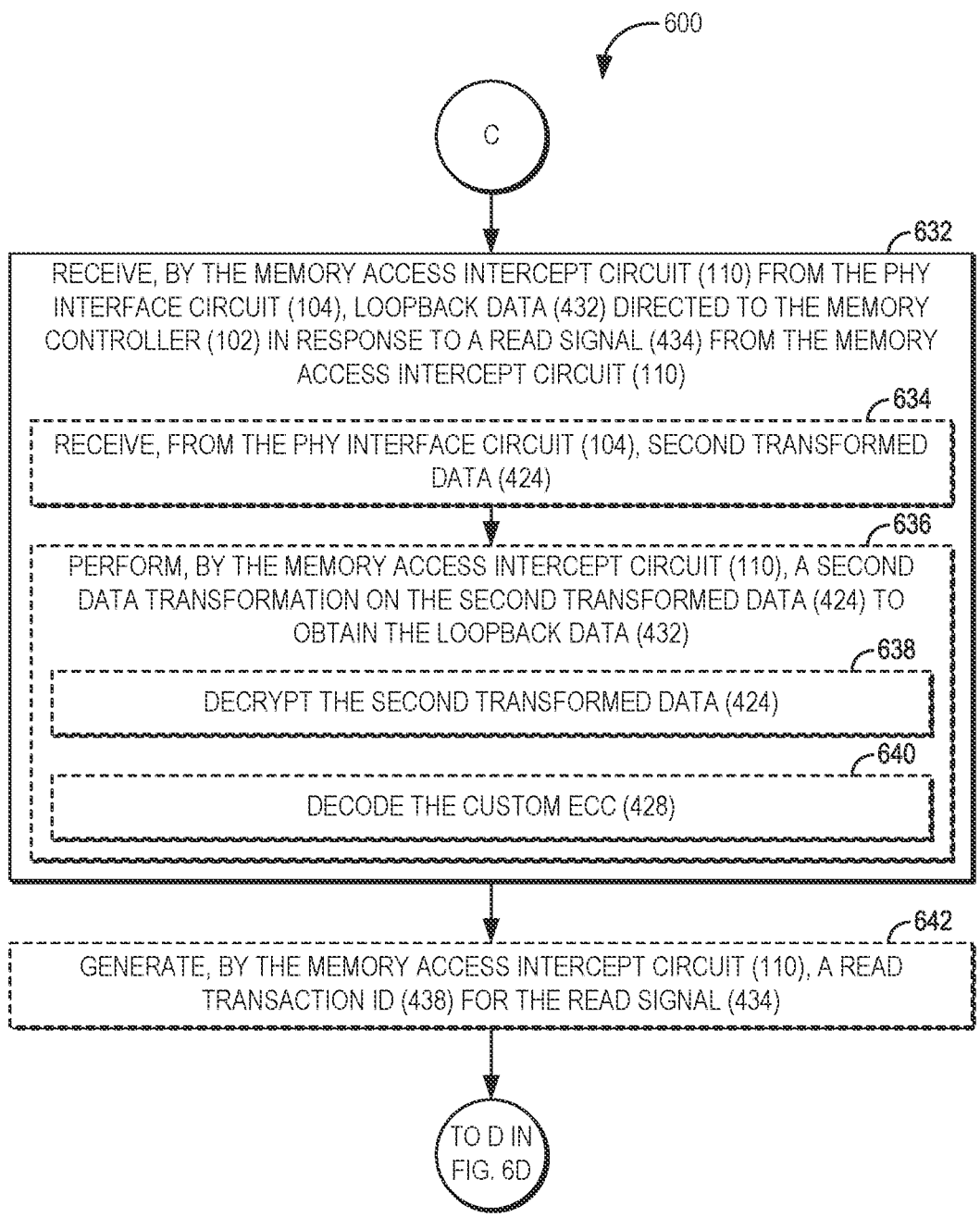

Referring now to FIG. 6C, the memory access intercept circuit 110 subsequently receives, from the PHY interface circuit 104, loopback data (such as the loopback data 432 of FIGS. 4-5) directed to the memory controller 102 in response to a read signal (e.g., the read signal 434 of FIG. 4) from the memory access intercept circuit 110 (block 632). Some aspects may provide that the operations of block 632 for receiving the loopback data 432 comprises the memory access intercept circuit 110 receiving, from the PHY interface circuit 104, second transformed data (e.g., the transformed data 424 of FIG. 4) (block 634). The memory access intercept circuit 110 then performs a second data transformation on the second transformed data 424 to obtain the loopback data 432 (block 636). In some such aspects, the operations of block 636 for performing the second data transformation may comprise decrypting the second transformed data 424 (block 638). According to some such aspects, the operations of block 636 for performing the second data transformation may comprise decoding the custom ECC 428 (block 640). The memory access intercept circuit 110 according to some aspects generates a read transaction ID (such as the read transaction ID 438 of FIG. 4) for the read signal 434 (block 642). The exemplary operations 600 in some aspects may continue at block 644 of FIG. 6D.

Figure 6D:
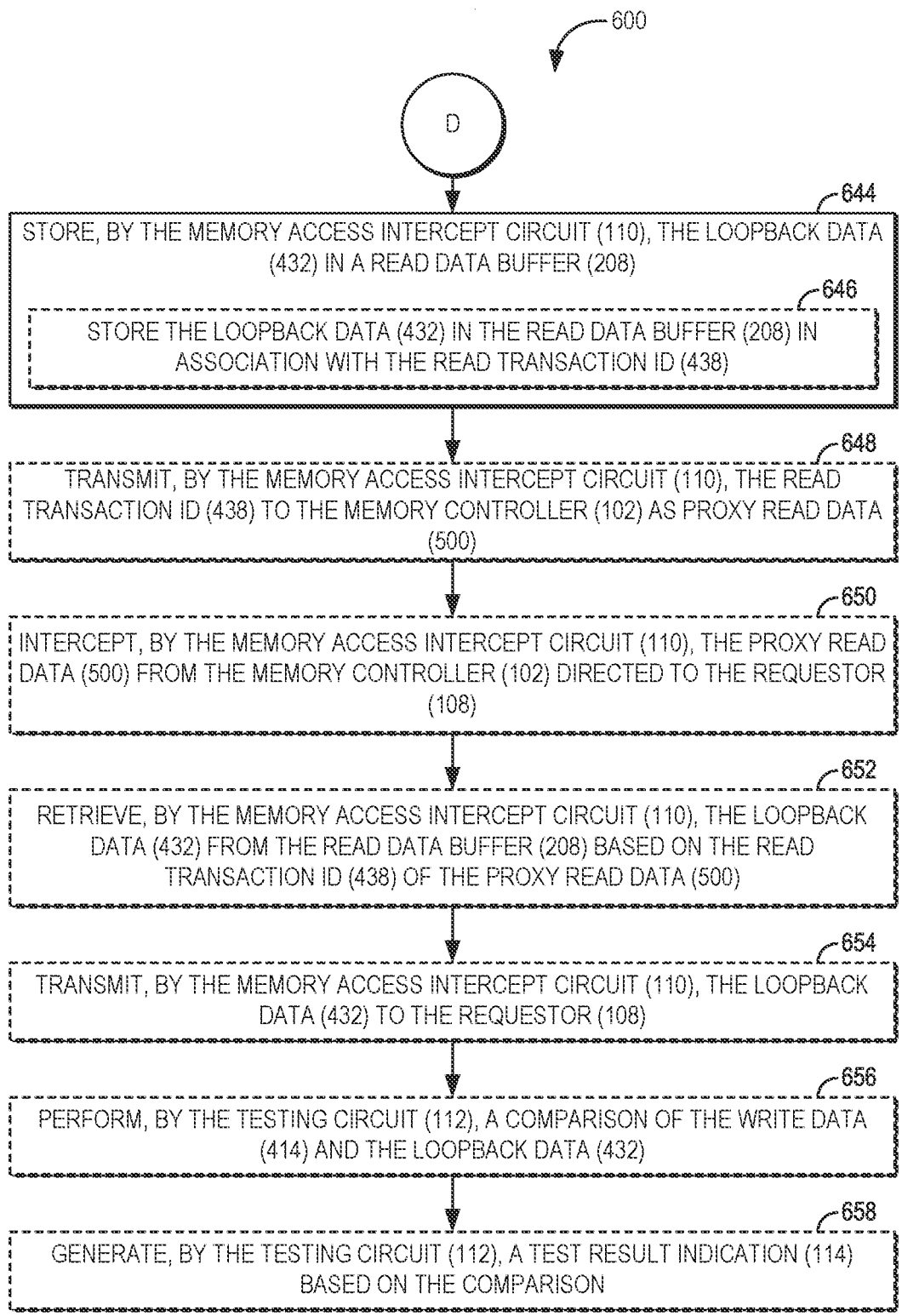

With reference now to FIG. 6D, the memory access intercept circuit 110 stores the loopback data 432 in a read data buffer (such as the read data buffer 208 of FIGS. 2-5) (block 644). In aspects such as those referenced by block 642 above, the operations of block 644 for storing the loopback data 432 in the read data buffer 208 may comprise storing the loopback data 432 in the read data buffer 208 in association with the read transaction ID 438 (block 646). The memory access intercept circuit 110 in some aspects transmits the read transaction ID 438 to the memory controller 102 as proxy read data (e.g., the proxy read data 500 of FIG. 5) (block 648). The memory access intercept circuit 110 intercepts the proxy read data 500 from the memory controller 102 directed to the requestor 108 (block 650). The memory access intercept circuit 110 next retrieves the loopback data 432 from the read data buffer 208 based on the read transaction ID 438 of the proxy read data 500 (block 652). The memory access intercept circuit 110 then transmits the loopback data 432 to the requestor 108 (block 654). In aspects in which the requestor 108 comprises the testing circuit 112 of FIG. 1, the testing circuit 112 may perform a comparison of the write data 414 and the loopback data 432 (block 656). The testing circuit 112 in such aspects may then generate a test result indication (such as the test result indication 114 of FIG. 1) based on the comparison (block 658).

The memory access intercept circuit according to aspects disclosed herein and discussed with reference to FIGS. 1-5 and 6A-6D may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
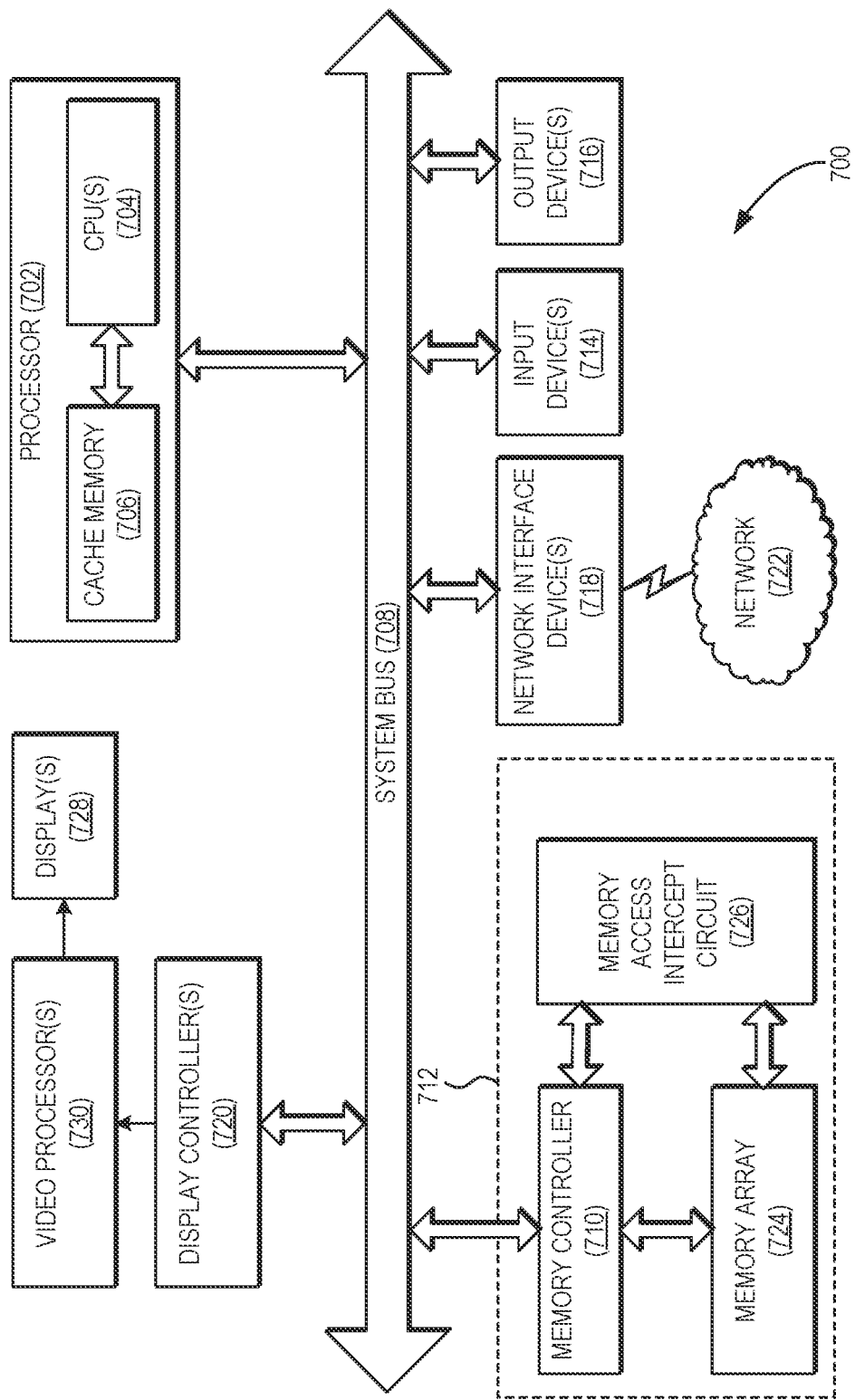
FIG. 7 is a block diagram of an exemplary processor-based device including a memory access intercept circuit.

In this regard, FIG. 7 illustrates an example of a processor-based device 700 that includes a memory access interrupt circuit as illustrated and described with respect to FIGS. 1-5 and 6A-6D. In this example, the processor-based device 700, which corresponds in functionality to the processor-based device 100 of FIG. 1, includes a processor 702 which comprises one or more CPUs 704 coupled to a cache memory 706. The CPU(s) 704 is also coupled to a system bus 708, and can intercouple devices included in the processor-based device 700. As is well known, the CPU(s) 704 communicates with these other devices by exchanging address, control, and data information over the system bus 708. For example, the CPU(s) 704 can communicate bus transaction requests to a memory controller 710. Although not illustrated in FIG. 7, multiple system buses 708 could be provided, wherein each system bus 708 constitutes a different fabric.

Other devices may be connected to the system bus 708. As illustrated in FIG. 7, these devices can include a memory system 712, one or more input devices 714, one or more output devices 716, one or more network interface devices 718, and one or more display controllers 720, as examples. It is to be understood that the memory system 712 may be arranged in a configuration other than that shown in FIG. 7 (e.g., may be arranged on a same die as the CPUs 704, on a separate die from the CPUs 704, or in another socket of the processor-based device 700, as non-limiting examples) and/or may include elements in addition to and/or in place of the elements shown in FIG. 7. The input device(s) 714 can include any type of input device, including, but not limited to, input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 718 can be configured to support any type of communications protocol desired. The memory system 712 can include the memory controller 710 coupled to one or more memory arrays 724 and a memory access intercept circuit 726 (such as, e.g., the memory access intercept circuit 110 of FIGS. 1-5).

The CPU(s) 704 may also be configured to access the display controller(s) 720 over the system bus 708 to control information sent to one or more displays 728. The display controller(s) 720 sends information to the display(s) 728 to be displayed via one or more video processors 730, which process the information to be displayed into a format suitable for the display(s) 728. The display(s) 728 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based device, comprising:
a memory controller;
a physical (PHY) interface circuit communicatively coupled to the memory controller, wherein the PHY interface circuit is configured to operate in a loopback mode; and
a memory access intercept circuit configured to operate in the loopback mode by being configured to:
receive, from a requestor, a memory write request that is directed to and received by the memory controller;
transmit proxy write data to the memory controller;
intercept write data from the requestor directed to the memory controller for the memory write request;
store the write data in a write data buffer;
intercept the proxy write data from the memory controller directed to the PHY interface circuit;
retrieve the write data from the write data buffer;
transmit the write data to the PHY interface circuit;
receive, from the PHY interface circuit, loopback data directed to the memory controller in response to a read signal from the memory access intercept circuit; and
store the loopback data in a read data buffer.

2. The processor-based device of claim 1, wherein:
the memory access intercept circuit is further configured to:
generate a write transaction identifier (ID) for the memory write request; and
generate a read transaction ID for the read signal; and
the memory access intercept circuit is configured to:
transmit the proxy write data to the memory controller by being configured to transmit the write transaction ID to the memory controller as the proxy write data;

store the write data in the write data buffer by being configured to store the write data in the write data buffer in association with the write transaction ID;
retrieve the write data from the write data buffer by being configured to retrieve the write data from the write data buffer based on the write transaction ID of the proxy write data; and
store the loopback data in the read data buffer by being configured to store the loopback data in the read data buffer in association with the read transaction ID.

3. The processor-based device of claim 2, wherein the memory access intercept circuit is further configured to:
transmit the read transaction ID to the memory controller as proxy read data;
intercept the proxy read data from the memory controller directed to the requestor;
retrieve the loopback data from the read data buffer based on the read transaction ID of the proxy read data; and
transmit the loopback data to the requestor.

4. The processor-based device of claim 3, wherein the requestor comprises a testing circuit configured to:
perform a comparison of the write data and the loopback data; and
generate a test result indication based on the comparison.

5. The processor-based device of claim 1, wherein:
the memory access intercept circuit is further configured to perform a first data transformation on the write data to generate first transformed data; and
the memory access intercept circuit is configured to transmit the write data to the PHY interface circuit by being configured to transmit the first transformed data as the write data.

6. The processor-based device of claim 5, wherein the memory access intercept circuit is configured to perform the first data transformation by being configured to encrypt the write data.

7. The processor-based device of claim 5, wherein the memory access intercept circuit is configured to perform the first data transformation by being configured to encode a custom error correction code (ECC) based on the write data.

8. The processor-based device of claim 1, wherein the memory access intercept circuit is configured to receive the loopback data by being configured to:
receive, from the PHY interface circuit, second transformed data; and
perform a second data transformation on the second transformed data to obtain the loopback data.

9. The processor-based device of claim 8, wherein the memory access intercept circuit is configured to perform the second data transformation by being configured to decrypt the second transformed data.

10. The processor-based device of claim 8, wherein the memory access intercept circuit is configured to perform the second data transformation by being configured to decode a custom error correction code (ECC).

11. A method for extending functionality of memory controllers using a loopback mode for testing in a processor-based device, comprising:
receiving, by a memory access intercept circuit of the processor-based device from a requestor, a memory write request that is directed to and received by a memory controller of the processor-based device;
transmitting, by the memory access intercept circuit, proxy write data to the memory controller;
intercepting, by the memory access intercept circuit, write data from the requestor directed to the memory controller for the memory write request;
storing, by the memory access intercept circuit, the write data in a write data buffer;
intercepting, by the memory access intercept circuit, the proxy write data from the memory controller directed to a physical (PHY) interface circuit of the processor-based device;
retrieving, by the memory access intercept circuit, the write data from the write data buffer;
transmitting, by the memory access intercept circuit, the write data to the PHY interface circuit;
receiving, by the memory access intercept circuit from the PHY interface circuit, loopback data directed to the memory controller in response to a read signal from the memory access intercept circuit; and
storing, by the memory access intercept circuit, the loopback data in a read data buffer.

12. The method of claim 11, wherein:
the method further comprises:
generating, by the memory access intercept circuit, a write transaction identifier (ID) for the memory write request; and
generating, by the memory access intercept circuit, a read transaction ID for the read signal;
transmitting the proxy write data to the memory controller comprises transmitting the write transaction ID to the memory controller as the proxy write data;
storing the write data in the write data buffer comprises storing the write data in the write data buffer in association with the write transaction ID;
retrieving the write data from the write data buffer comprises retrieving the write data from the write data buffer based on the write transaction ID of the proxy write data; and
storing the loopback data in the read data buffer comprises storing the loopback data in the read data buffer in association with the read transaction ID.

13. The method of claim 12, further comprising:
transmitting, by the memory access intercept circuit, the read transaction ID to the memory controller as proxy read data;
intercepting, by the memory access intercept circuit, the proxy read data from the memory controller directed to the requestor;
retrieving, by the memory access intercept circuit, the loopback data from the read data buffer based on the read transaction ID of the proxy read data; and
transmitting, by the memory access intercept circuit, the loopback data to the requestor.

14. The method of claim 13, wherein:
the requestor comprises a testing circuit; and
the method further comprises:
performing, by the testing circuit, a comparison of the write data and the loopback data; and
generating, by the testing circuit, a test result indication based on the comparison.

15. The method of claim 11, wherein:
the method further comprises performing, by the memory access intercept circuit, a first data transformation on the write data to generate first transformed data; and
transmitting the write data to the PHY interface circuit comprises transmitting the first transformed data as the write data.

16. The method of claim 15, wherein performing the first data transformation comprises encrypting the write data.

17. The method of claim 15, wherein performing the first data transformation comprises encoding a custom error correction code (ECC) based on the write data.

18. The method of claim 11, wherein receiving the loopback data comprises:
   receiving, from the PHY interface circuit, second transformed data; and
   performing a second data transformation on the second transformed data to obtain the loopback data.

19. The method of claim 18, wherein performing the second data transformation comprises decrypting the second transformed data.

20. The method of claim 18, wherein performing the second data transformation comprises decoding a custom error correction code (ECC).

* * * * *